United States Patent [19]

Witte et al.

[11] Patent Number: 4,486,395
[45] Date of Patent: Dec. 4, 1984

[54] CONTINUOUSLY WORKING CRYSTALLIZER

[75] Inventors: Johan F. Witte, Amsterdam; Jan W. L. M. Horsmans, Hoofddorp, both of Netherlands

[73] Assignee: Goudsche Machinefabriek B.V., Gouda, Netherlands

[21] Appl. No.: 382,087

[22] Filed: May 26, 1982

Related U.S. Application Data

[63] Continuation of Ser. No. 218,035, Dec. 19, 1980, abandoned.

[30] Foreign Application Priority Data

Dec. 19, 1979 [NL] Netherlands ............... 7909152

[51] Int. Cl.³ ............................................... B01D 9/02
[52] U.S. Cl. ............................ 422/254; 127/16
[58] Field of Search ............... 422/200, 202, 205, 225, 422/245, 253, 254; 127/16; 62/532, 544, 545

[56] References Cited

U.S. PATENT DOCUMENTS

| | | | |
|---|---|---|---|
| 2,458,440 | 1/1949 | Stafford | 422/254 |
| 2,570,612 | 10/1951 | Vahl | 422/254 |
| 2,593,300 | 4/1952 | Hachmuth | 62/544 |
| 2,800,411 | 7/1957 | Church | 422/254 |
| 3,321,282 | 5/1967 | Schneider et al. | 422/254 |
| 3,829,293 | 8/1974 | Waquier et al. | 422/254 |
| 3,837,812 | 9/1974 | Boontje | 422/225 |

FOREIGN PATENT DOCUMENTS

| | | | |
|---|---|---|---|
| 146394 | 12/1975 | Netherlands | 422/254 |
| 1075919 | 7/1967 | United Kingdom | . |
| 704642 | 12/1979 | U.S.S.R. | 422/254 |

*Primary Examiner*—David L. Lacey
*Attorney, Agent, or Firm*—Diller, Ramik & Wight

[57] ABSTRACT

The invention relates to a continuously working crystallizer in the shape of an oblong vessel with at its one end a supply and at its other end a discharge for the solution, with a rotatable driven horizontal shaft extending in lengthwise direction of the vessel and provided with discs extending in transverse direction, said discs being provided with a passage opening for the solution, said discs dividing the vessel in a number of sections succeeding in lengthwise direction to each other, each section having one or more cooled wall surfaces and conduits being provided for supplying and discharging a cooling fluid which is flowing along these cooled wall surfaces.

7 Claims, 5 Drawing Figures

CONTINUOUSLY WORKING CRYSTALLIZER

CROSS REFERENCE TO RELATED APPLICATION

This application is a continuation of copending application Ser. No. 218,035, filed Dec. 19, 1980 and now abandoned.

BACKGROUND OF THE INVENTION

Such a crystallizer is known from the Dutch patent specification No. 146,394. This known crystallizer is in the shape of a trough and between the discs attached to the shaft are arranged cooling bodies which reach downwardly to the shaft. The discs leave a large space free between the discs and the wall of the trough. The cooling bodies are placed at a small angle and therefore a conveying action is obtained so that the slurry with crystals flows from the one section to the next downstream section. This known device can be used in a sense that it works effectively only with highly viscous solutions. Only with high viscosity solutions one has no problems with the formation of crystals on the cooled surfaces. Moreover, due to the high viscosity there is no problem of a local back flow of the solution to the next preceding or upstream section. The tendency to formation of crystals on the surfaces is defined by the following factors. The amount of heat withdrawn per unit of the cooling surface, the width of the metastable region of the relevant solution, the viscosity of the solution and of the produced slurry of crystals and the roughness of the cooled surfaces. In the case of a high viscosity, one has as a rule a broader metastable region, whereas the crystals will also settle less quickly, so that it is easier to have a homogeneous distribution of the crystals in the slurry.

It is also possible to have a larger cooling capacity per unit of cooling surface. On the other hand, with a low viscosity solution, one has as a rule a narrow metastable region and the crystals will settle quickly. With such a solution there is a considerably lower cooling capacity per unit of cooling surface possible and per ton of produced crystal it is necessary to install a considerably larger and more costly cooling surface. This is the reason that the known crystallizer can practically only be used in such cases, where one has crystallization in highly viscous solutions and where a relatively small amount of heat has to be withdrawn. This is for example the case when one has to aftercool sugar-syrup in a sugar factory.

The backflow in the known device when used with low viscosity liquids has for its result that a departure of the cooling profile occurs so that a product of inferior quality is obtained and that the formation of crystals at the cooling surfaces is promoted. This again has as its result that there is a larger resistance to the flow of heat and a smaller heat flux. In the case of a certain heat flux with a low viscosity solution in the vicinity of the cooled wall surface and in the case of a slowly moving solution the temperature profile can be such that the metastable region is passed so that an undesirable amount of crystal grains occurs and an increased formation of crystals on the wall surface will occur. From the above it will be clear that the known crystallizer cannot be used in the case of low viscosity solutions.

The invention has for its aim to provide a crystallizer as described above which is suited for solutions of low viscosity.

According to the invention the discs over the larger part of its circumference fit with small clearance to the wall of the vessel or to a portion connected with that wall and on the shaft in each section scrapers have been provided which touch along the cooled wall surfaces.

With such a device the cooled wall surfaces are kept free from crystals adhering to these surfaces and because the scrapers also have the function of stirrers, one has in each section a good mixing so that the crystals are distributed homogeneously and in the case of a certain heat flux a less steep temperature profile in the vicinity of the cooled wall surface is obtained, so that it is prevented that crystals are formed as a result of passing the metastable region. Owing to the stirring effect of the scrapers one has moreover a good withdrawal of heat from the solution in each section. The crystallizer according to the invention can also be used for crystallization from a clear liquid in which no crystal seed is present. In the first section the solution is then strongly undercooled so that grains are formed and in the next sections such an amount of heat is withdrawn that the solution stays in the metastable region and no new crystals are formed but only the already existing crystals are growing.

According to the invention the vessel can have the shape of a trough and in the trough there are arranged filling pieces having outer edges which fit to the wall of the trough, an upper edge extending above the liquid surface and an inner edge fit with small clearance to the outer circumference of the discs arranged on the shaft. In such an embodiment the section of the trough does not necessarily have to be round and due to the filling pieces one has a good separation between the sections enclosed between the discs.

In an advantageous embodiment according to the invention in each section between the discs a disc-like cooling element is provided, the cooling surfaces of this element being directed perpendicular to the shaft and on the shaft scrapers have been attached which touch the cooling surfaces of the cooling elements with scaper edges directed perpendicular to the shaft. Further according to the invention the cooling elements have a recess directed in the radial and vertical direction, said recess receiving the shaft. In such an embodiment it is easy to remove the cooling elements and to clean these elements in case of operational faults or crystals adhering to the cooling elements.

According to the invention the vessel can have a double wall and the chamber enclosed by the double walls is used as a cooling chamber, said chamber by transverse partitions being divided in sections succeeding to each other in axial direction and the discs are provided with scraper edges extending in axial directions, said scraper edges touching the cooled wall of the vessel. The sections between the discs mounted on the shaft can now be completely free so that only the scrapers are moving in the sections and also are acting as stirrers.

According to the invention, the scraper edges of the succeeding discs are displaced in circumferential direction in relation to each other. This has for its result that in each section a stirring action is obtained in different places seen in circumferential direction.

According to the invention, the length of the axially directed scraper edges is such that the scraper edges of the succeeding discs overlap in axial direction. Here one is such that the whole wall surface is scraped in an efficient way.

According to the invention, the passage openings in the discs consist of sector-shaped or segment-shaped recesses. This has for its result that on only one place of the disc is a passage near the circumference of the vessel, and this passage opening is displaced continuously along the circumference of the vessel.

According to the invention the succeeding discs provided with passage openings are arranged in such a way that the passage openings in circumferential direction are rotated in relation to each other. The risk that a section is short circuited is reduced.

In an efficient embodiment according to the invention the succeeding discs are rotated over 180° in relation to each other. Here it is practically impossible that the liquid from a preceding section is flowing through a section directly to the next section.

The liquid has to cover a relatively long path inside a section and during the flowing along this path, the liquid is sufficiently stirred.

According to the invention, the double walled vessel can be cylindrical and closed. This makes it possible to handle solutions in the crystallizer which must be held out of contact with the atmosphere.

BRIEF DESCRIPTION OF THE DRAWING FIGURES

The invention will be elucidated in the following description of some embodiments shown in the drawing.

DETAILED DESCRIPTION OF THE INVENTION

Figure 1:
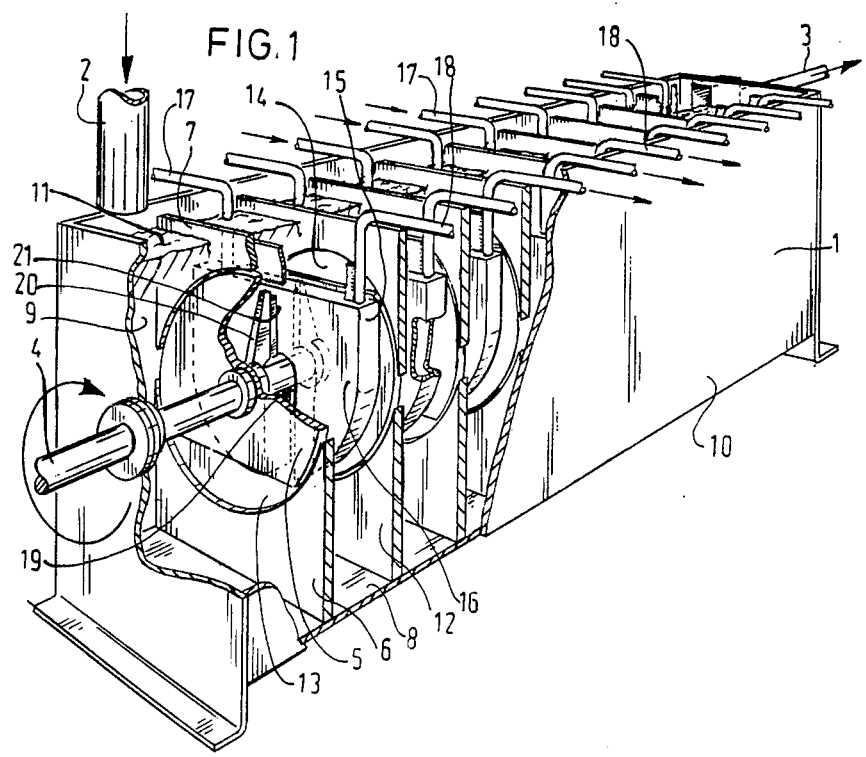
FIG. 1 is a perspective view, partly broken away, showing a crystallizer according to the invention.

The crystallizer shown in FIG. 1 consists of a rectangular oblong vessel 1 having at the one end a supply 2 for the liquid to be crystallized and at the other end a discharge for the same liquid. Through the vessel extends a shaft 4 which can be rotatably driven in a way not shown. On the shaft 4 are mounted discs 5 which extend transversely in relation to the shaft and which are fixedly attached to the shaft. The discs have a circular form and fit at the circumference with small clearance to the lower and upper filling pieces 6 and 7 which are provided with a suitable shaped edge. With the outer circumference the filling pieces 6 fit at the under edge to the bottom 8 and at the side edges to the side walls 9 and 10 of the vessel 1. The filling pieces 7 fit at the side edges to the walls 9 and 10 of the vessel 1 and with the upper edge the filling pieces extend above the level of the solution 11 supplied by the supply pipe 2. The succeeding discs 5 provided on the shaft 4 are enclosed by means of the filling pieces which form the sections 12. The succeeding sections 12 of the vessel 1 form stages which are connected by the fact that each disc at one side is flattened so that a segment is lacking.

Figure 2:
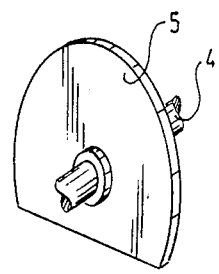
FIG. 2 is a detail of one of the discs of the crystallizer of FIG. 1.
Figure 5:
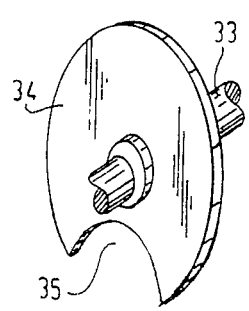
FIG. 5 shows one of the discs of the crystallizer according to FIGS. 3 and 4 in detail.

FIG. 2 shows clearly the shape of the disc. The connecting opening between the first two stages is indicated at 13 in FIG. 1, whereas the opening between the second and third stages shown in the drawing at 14. The discs are rotated in relation to each other over 180°, so that the openings 13 and 14 also are displaced over 180° in relation to each other. In each stage a cooling element 15 is arranged. This cooling element consists of a flat box with side surfaces 16. The side surfaces 16 are flat and extend transversely of the shaft 4. Each cooling element 15 is provided with the supply 17 and the discharge 18 for the cooling fluid flowing through the cooling element. The cooling element 15 has a radially and vertically directed recess 19 with which recess 19 the elements 15 straddle the shaft 4. This makes it possible to remove and to remount the cooling elements 15 in any easy way. On each side of each cooling element 15 on the shaft are attached scrapers 20 which are provided with scraper edges 21 directed transversely on the shaft 4. These scraper edges 21 touch along the cooling surfaces 16 of the cooling elements 15.

The working of the crystallizer is as follows. Through the supply 2 a solution is supplied and discharged through the discharge 3, a liquid level which is sloping slowly will be set in the succeeding stages formed between sections 12. The shaft 4 is driven and through the openings 13 and 14 left free by the discs 5 the solution will flow from the one section to the next section. The openings 13 and 14 are continuously moved so that no short circuiting can occur. Through the lines 17 cooling fluid is supplied to the different cooling elements 15 and this fluid is discharged through the lines 18. The cooled wall surfaces 16 of the cooling elements 11 are continuously cleaned of crystals adhering to these cooling surfaces by the scrapers 20 the edges 21 of the scrapers touching the surfaces 16. Moreover the scrapers 20 are efficiently stirring the liquid in each section 12 so that in each section there is a homogeneous temperature. The crystals are homogeneously distributed in the liquid and one has a less steep temperature profile in the vicinity of the cooling wall, so that the metastable region of the solution is not surpassed.

Figure 3:
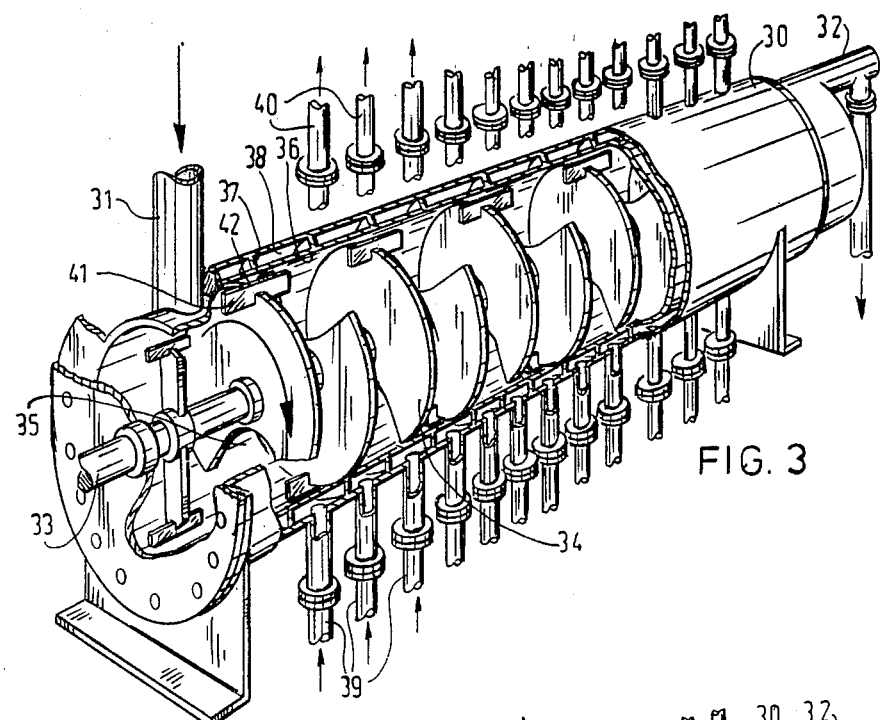
FIG. 3 is a perspective view, partly broken away, of a crystallizer according to the invention in another embodiment.

In the embodiment according to FIG. 3, the crystallizer is formed by a closed cylindrical vessel 30 that at its one end is provided with a supply 31 and at its other end is provided with a discharge 32. Through the vessel 30 extends a shaft 33 with discs 34. The discs 34 show a sector-shaped recess 35. The vessel 30 has an inner wall 36 which lies in some distance from the outer wall so that a hollow chamber between the outer wall of the vessel 30 and the inner wall 36 is formed. Partitions 37 extending in transverse direction relative to the vessel divide the hollow chamber into sections 38, each section is provided with a supply 39 and a discharge 40 for a cooling fluid. The cooling fluid can flow through the sections 38 in series or parallel. Each disc 34 has a scraper 41 with a scraper edge 42 which extends in axial direction and touches along the cooling wall 36. The discs 34 are positioned such that the openings 35 are disposed at an angle of 180° in relation to each other. The scrapers 41 of each disc are lying diametrically opposite to the opening 35, such that the scrapers 41 of the succeeding discs 34 are disposed at an angle of 180° relative to each other.

In axial direction the scrapers of the succeeding discs 34 are overlapping each other so that a part of the wall 36 is scraped twice during each rotation. The scrapers 41 prevent the crystals from adhering to the cooling surfaces and moreover the scrapers 41 are stirring the liquid in each stage which is enclosed between two succeeding discs 34.

Figure 4:
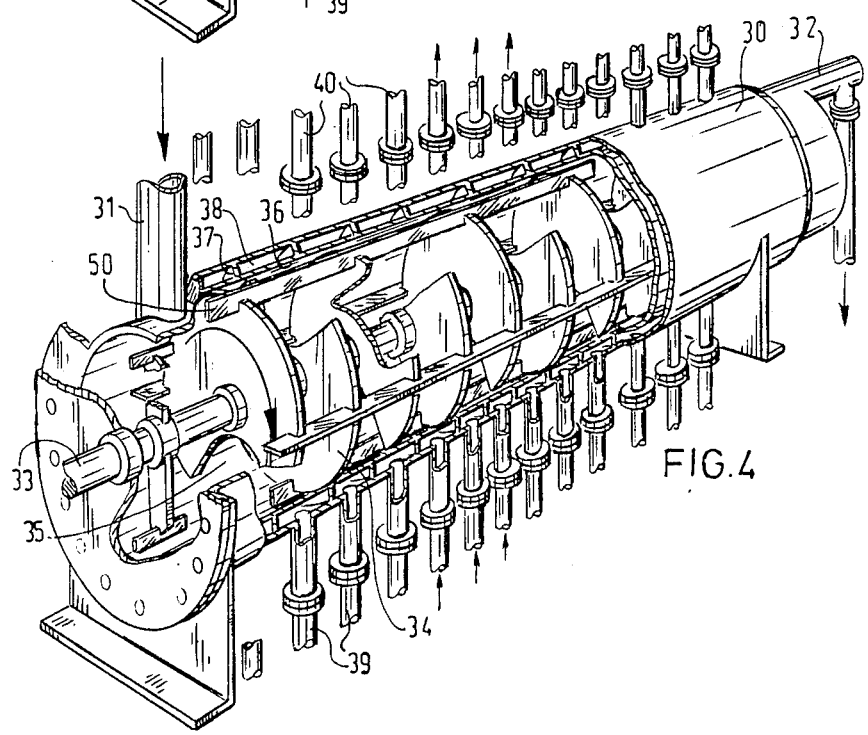
FIG. 4 is a perspective view, partly broken away of a crystallizer in yet another embodiment.

In the embodiment shown in FIG. 4, scrapers are provided which are disposed at an angle of 90° in relation to each other and which extend in axial direction over the full length of the vessel 30. The discs 34 have scrapers 50 which are common for all discs. Further, this embodiment corresponds completely with the embodiment according to FIG. 3.

With reference to the embodiment according to FIG. 1, it can be remarked that according to the invention the lower half of the oblong trough shaped vessel can have a half circular section. The circular discs can then fit directly to the bottom of the vessel and the filling pieces 6 can be eliminated.

What is claimed is:

1. A continuous crystallizer for growing crystals from a low viscosity solution, said apparatus comprising, in combination:
    a horizontally elongate vessel having an inlet at one end for a crystallizer solution of low viscosity, an outlet at its other end for depleted crystallizer solution having a homogeneous distribution of crystals therein;
    a horizontal shaft extending through said vessel and having a series of circular discs fixed in axially spaced sequence thereto, each disposed in a plane perpendicular to the shaft and cooperating with wall means within the confines of the vessel and which wall means surrounding such discs with small clearance to divide the interior thereof into sequential crystal-growing stages;
    means for rotating said shaft;
    cooling means at each of said stages for withdrawing heat to promote crystal growth;
    said discs having recesses encompassing only minor portions of the circumferences of said discs and constituting substantially the sole passageways from stage-to-stage, said recesses being circumferentially staggered from stage-to-stage, and
    scraper means supported by the shaft and positioned and arranged to scrape the cooling means to prevent accretion of crystals thereon while maintaining the homogeneous distribution of growing crystals within the solution for assuring progressive crystal growth from stage-to-stage while maintaining such growing crystals in homogeneously distributed condition within and throughout the solution in each of said stages.

2. A continuous crystallizer as defined in claim 1 wherein said wall means comprise partitions surrounding each of said discs.

3. A continuous crystallizer as defined in claim 2 wherein said cooling means comprises a cooling element disposed between each adjacent pair of said discs.

4. A continuous crystallizer as defined in claim 3 wherein each cooling element includes a wall disposed in a plane perpendicular to said shaft and said scraper means comprises a scraper element mounted directly on said shaft between said wall and an adjacent one of said discs.

5. A continuous crystallizer as defined in claim 1 wherein said vessel is of closed cylindrical form and having an outer wall and an inner wall defining said wall means, there also being partitions extending between said inner and outer walls to define cooling chambers defining said cooling means.

6. A continuous crystallizer as defined in claim 5 wherein said scraper means comprises scraper elements fixed to the peripheries of said discs and sweeping substantially the entire lengths of said inner wall.

7. A continuous crystallizer as defined in claim 6 wherein said scraper elements are fixed to the peripheries of said discs diametrically opposite said recesses.

* * * * *